(12) United States Patent
Osman

(10) Patent No.: US 9,762,817 B2
(45) Date of Patent: *Sep. 12, 2017

(54) OVERLAY NON-VIDEO CONTENT ON A MOBILE DEVICE

(71) Applicant: Sony Computer Entertainment Inc., Minato-ku (JP)

(72) Inventor: Steven Osman, San Francisco, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,239

(22) Filed: Sep. 21, 2015

(65) Prior Publication Data

US 2016/0014350 A1    Jan. 14, 2016

Related U.S. Application Data

(63) Continuation of application No. 13/554,958, filed on Jul. 20, 2012, now Pat. No. 9,143,699, which is a
(Continued)

(51) Int. Cl.
*H04N 5/262* (2006.01)
*H04N 5/272* (2006.01)
(Continued)

(52) U.S. Cl.
CPC ......... *H04N 5/272* (2013.01); *H04N 5/23216* (2013.01); *H04N 5/23293* (2013.01);
(Continued)

(58) Field of Classification Search
CPC ......... H04N 21/23892; H04N 21/4307; H04N 5/2621
(Continued)

(56) References Cited

U.S. PATENT DOCUMENTS 4,787,051 A    11/1988    Olson
4,843,568 A    6/1989    Krueger
(Continued)

FOREIGN PATENT DOCUMENTS

CN    101374090 A    2/2009
CN    101651834 A    2/2010
(Continued)

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262 270.
(Continued)

*Primary Examiner* — Usman Khan
(74) *Attorney, Agent, or Firm* — Kilpatrick Townsend & Stockton LLP

(57) ABSTRACT

Methods, systems, and devices are described for presenting non-video content through a mobile device that uses a video camera to track a video on another screen. In one embodiment, a system includes a video display, such as a TV, that displays video content. A mobile device with an integrated video camera captures video data from the TV and allows a user to select an area in the video in order to hear/feel/smell what is at that location in the video.

20 Claims, 16 Drawing Sheets

Related U.S. Application Data continuation-in-part of application No. 12/835,645, filed on Jul. 13, 2010, now Pat. No. 8,730,354.

(60) Provisional application No. 61/527,048, filed on Sep. 12, 2011.

(51) Int. Cl.
| | |
|---|---|
| *H04N 21/2389* | (2011.01) |
| *H04N 21/414* | (2011.01) |
| *H04N 21/43* | (2011.01) |
| *H04N 21/44* | (2011.01) |
| *H04N 5/232* | (2006.01) |
| *H04N 21/4223* | (2011.01) |

(52) U.S. Cl.
CPC ..... *H04N 5/2621* (2013.01); *H04N 21/23892* (2013.01); *H04N 21/41407* (2013.01); *H04N 21/4223* (2013.01); *H04N 21/4307* (2013.01); *H04N 21/44008* (2013.01)

(58) Field of Classification Search
USPC .......................................................... 348/239
See application file for complete search history.

(56) References Cited

U.S. PATENT DOCUMENTS

| | | |
|---|---|---|
| 5,128,671 A | 7/1992 | Thomas, Jr. |
| 5,528,265 A | 6/1996 | Harrison |
| 5,929,849 A | 7/1999 | Kikinis |
| 6,157,368 A | 12/2000 | Faeger |
| 6,247,022 B1 | 6/2001 | Yankowski |
| 6,375,572 B1 | 4/2002 | Masuyama |
| 7,036,083 B1 | 4/2006 | Zenith |
| 7,200,857 B1 | 4/2007 | Rodriguez et al. |
| 7,209,942 B1 | 4/2007 | Hori et al. |
| 7,549,052 B2 | 6/2009 | Haitsma et al. |
| 7,581,034 B2 | 8/2009 | Polivy et al. |
| 7,599,580 B2 | 10/2009 | King et al. |
| 7,898,504 B2 | 3/2011 | Fischer |
| 8,037,496 B1 | 10/2011 | Begeja et al. |
| 8,188,969 B2 | 5/2012 | Morin et al. |
| 8,253,649 B2 | 8/2012 | Imai et al. |
| 8,463,000 B1 | 6/2013 | Kaminski, Jr. |
| 8,560,583 B2 | 10/2013 | Mallinson |
| 8,644,842 B2 | 2/2014 | Arrasvuori et al. |
| 8,730,354 B2 | 5/2014 | Stafford et al. |
| 8,838,671 B2 | 9/2014 | Wies et al. |
| 8,874,575 B2 | 10/2014 | Mallinson |
| 9,113,217 B2 | 8/2015 | Mallinson |
| 9,143,699 B2 | 9/2015 | Osman |
| 9,264,785 B2 | 2/2016 | Mallinson |
| 9,473,820 B2 | 10/2016 | Mallinson |
| 2002/0028000 A1 | 3/2002 | Conwell et al. |
| 2002/0059604 A1 | 5/2002 | Papagan |
| 2002/0078456 A1 | 6/2002 | Hudson et al. |
| 2002/0085097 A1 | 7/2002 | Colmenarez et al. |
| 2002/0140855 A1 | 10/2002 | Hayes |
| 2002/0162118 A1 | 10/2002 | Levy et al. |
| 2002/0186676 A1 | 12/2002 | Milley et al. |
| 2003/0028873 A1 | 2/2003 | Lemmons |
| 2003/0093790 A1 | 5/2003 | Logan et al. |
| 2003/0152366 A1 | 8/2003 | Kanazawa et al. |
| 2003/0156144 A1 | 8/2003 | Morita |
| 2003/0171096 A1 | 9/2003 | Ilan et al. |
| 2003/0185541 A1 | 10/2003 | Green et al. |
| 2003/0212762 A1 | 11/2003 | Barnes et al. |
| 2004/0001161 A1 | 1/2004 | Herley |
| 2004/0210824 A1 | 10/2004 | Shoff et al. |
| 2004/0212589 A1 | 10/2004 | Hall et al. |
| 2005/0005308 A1 | 1/2005 | Logan et al. |
| 2005/0108026 A1 | 5/2005 | Brierre |
| 2005/0123267 A1 | 6/2005 | Tsumagari |
| 2005/0193425 A1 | 9/2005 | Sull et al. |
| 2005/0220439 A1 | 10/2005 | Carton et al. |
| 2005/0227674 A1 | 10/2005 | Kopra et al. |
| 2005/0262548 A1 | 11/2005 | Shimojo et al. |
| 2006/0038833 A1 | 2/2006 | Mallinson et al. |
| 2006/0053472 A1 | 3/2006 | Goto et al. |
| 2006/0064734 A1 | 3/2006 | Ma |
| 2006/0184960 A1 | 8/2006 | Horton et al. |
| 2006/0285772 A1 | 12/2006 | Hull et al. |
| 2007/0106551 A1 | 5/2007 | McGucken |
| 2007/0124756 A1 | 5/2007 | Covell et al. |
| 2007/0130580 A1 | 6/2007 | Covell et al. |
| 2007/0136773 A1 | 6/2007 | O'Neil et al. |
| 2007/0143777 A1 | 6/2007 | Wang et al. |
| 2007/0143778 A1 | 6/2007 | Covell et al. |
| 2007/0169115 A1 | 7/2007 | Ko et al. |
| 2007/0250716 A1 | 10/2007 | Brunk et al. |
| 2008/0215679 A1 | 9/2008 | Gillo et al. |
| 2008/0226119 A1 | 9/2008 | Candelore et al. |
| 2008/0246694 A1 | 10/2008 | Fischer |
| 2008/0267584 A1 | 10/2008 | Green |
| 2008/0275763 A1 | 11/2008 | Tran et al. |
| 2008/0276278 A1 | 11/2008 | Krieger et al. |
| 2009/0037975 A1 | 2/2009 | Ishikawa et al. |
| 2009/0055383 A1 | 2/2009 | Zalewski |
| 2009/0063277 A1 | 3/2009 | Bernosky et al. |
| 2009/0123025 A1 | 5/2009 | Deng et al. |
| 2009/0154806 A1 | 6/2009 | Chang et al. |
| 2009/0228921 A1 | 9/2009 | Miki et al. |
| 2009/0285444 A1 | 11/2009 | Erol et al. |
| 2009/0327894 A1 | 12/2009 | Rakib et al. |
| 2010/0007050 A1 | 1/2010 | Kagawa et al. |
| 2010/0053164 A1 | 3/2010 | Imai et al. |
| 2010/0100581 A1 | 4/2010 | Landow et al. |
| 2010/0119208 A1 | 5/2010 | Davis et al. |
| 2010/0149072 A1 | 6/2010 | Waeller et al. |
| 2010/0166309 A1 | 7/2010 | Hull et al. |
| 2010/0222102 A1 | 9/2010 | Rodriguez |
| 2010/0257252 A1 | 10/2010 | Dougherty et al. |
| 2010/0275235 A1 | 10/2010 | Joo et al. |
| 2010/0309225 A1 | 12/2010 | Gray et al. |
| 2010/0318484 A1 | 12/2010 | Huberman et al. |
| 2010/0322469 A1 | 12/2010 | Sharma |
| 2011/0053642 A1 | 3/2011 | Lee |
| 2011/0071838 A1 | 3/2011 | Li-Chun Wang et al. |
| 2011/0078729 A1 | 3/2011 | LaJoie et al. |
| 2011/0103763 A1 | 5/2011 | Tse et al. |
| 2011/0246495 A1 | 10/2011 | Mallinson |
| 2012/0059845 A1 | 3/2012 | Covell et al. |
| 2012/0099760 A1 | 4/2012 | Bernosky et al. |
| 2012/0143679 A1 | 6/2012 | Bernosky et al. |
| 2015/0026716 A1 | 1/2015 | Mallinson |
| 2015/0156542 A1 | 6/2015 | Covell et al. |
| 2015/0358679 A1 | 12/2015 | Mallinson |
| 2015/0379043 A1 | 12/2015 | Hull et al. |
| 2016/0030845 A1 | 2/2016 | Stafford et al. |
| 2016/0112762 A1 | 4/2016 | Mallinson |
| 2017/0013313 A1 | 1/2017 | Mallinson |
| 2017/0013314 A1 | 1/2017 | Mallinson |

FOREIGN PATENT DOCUMENTS

| | | |
|---|---|---|
| EP | 1053642 A1 | 11/2000 |
| EP | 2180652 A1 | 4/2010 |
| JP | P2000-242661 A | 9/2000 |
| JP | 2000-287184 A | 10/2000 |
| JP | P2001-036875 A | 2/2001 |
| JP | P2002-118817 A | 4/2002 |
| JP | P2002-198840 A | 7/2002 |
| JP | 2005-532578 A | 10/2005 |
| JP | 2006-5897 A | 1/2006 |
| JP | P2007-088801 A | 4/2007 |
| JP | 2008-283344 A | 11/2008 |
| JP | P2009-033769 A | 2/2009 |
| KR | 2008-0101075 A | 11/2008 |
| KR | 2009-0043526 A | 5/2009 |
| WO | 2004004351 A1 | 1/2004 |
| WO | 2004034281 A1 | 4/2004 |
| WO | 2005006610 A1 | 1/2005 |
| WO | 2007064641 A2 | 6/2007 |

(56) References Cited

FOREIGN PATENT DOCUMENTS

| WO | 2008024723 A2 | 2/2008 |
|----|---------------|--------|
| WO | WO2008/025407 A1 | 3/2008 |
| WO | 2008/051538 A2 | 5/2008 |
| WO | 2008056180 A2 | 5/2008 |
| WO | 2009032707 A1 | 3/2009 |
| WO | 2009036435 A1 | 3/2009 |
| WO | 2010020739 A1 | 2/2010 |

OTHER PUBLICATIONS

DeWitt, Thomas and Edelstein, Phil, "Pantomation: A System for Position Tracking," Proceedings of the $2^{nd}$ Symposium on Small Computers in the Arts, Oct. 1982, pp. 61-69.

Mohan et al., "Bokode: Imperceptible Visual tags for Camera Based Interaction from a Distance," ACM Transactions on Graphics, Jul. 2009, vol. 28(3), Article No. 98, pp. 1-2.

Mark Toner, Abstract of dissertation provided by Mr. Toner and purported to be maintained at Liverpool University, 1 page.

Tanaka et al., JP 2008-210683 article, Japanese language, PW080056, vol. 97, No. 1, Feb. 4, 1997, Information Processing Society of Japan, pp. 1-5.

Tanaka et al., Partial Translation of Ref., "Interactive Video Navigation System by Using the Media Fusion Technique of Video/TV and World Wide Web," Information Processing Society of Japan, Feb. 4, 1997, pp. 3-4.

PCT application No. PCT/US2011/042456, International Search Report and Written Opinion, dated Nov. 4, 2011, 8 pages.

Japanese Application No. 2016-058279, Office Action mailed Feb. 14, 2017, 6 pages.

OVERLAY NON-VIDEO CONTENT ON A MOBILE DEVICE

CROSS-REFERENCES TO RELATED APPLICATIONS

This application is a continuation of U.S. application Ser. No. 13/554,958, filed Jul. 20, 2012, entitled "OVERLAY NON-VIDEO CONTENT ON A MOBILE DEVICE," which is a continuation-in-part of U.S. patent application Ser. No. 12/835,645, filed Jul. 13, 2010, now U.S. Pat. No. 8,730,354, entitled "OVERLAY VIDEO CONTENT ON A MOBILE DEVICE," and which claims the benefit of U.S. Provisional Application No. 61/527,048, filed Sep. 12, 2011, entitled "OVERLAY NON-VIDEO CONTENT ON A MOBILE DEVICE," which are hereby incorporated by reference in their entireties for all purposes.

This application is related to U.S. patent application Ser. No. 13/554,963, filed Jul. 20, 2012, entitled "SUPPLEMENTAL CONTENT ON A MOBILE DEVICE," U.S. Provisional Patent Application No. 61/527,056, filed Sep. 12, 2011, entitled "SUPPLEMENTAL CONTENT ON A MOBILE DEVICE", U.S. patent application Ser. No. 12/835,657, filed Jul. 13, 2010, entitled "SUPPLEMENTAL VIDEO CONTENT ON A MOBILE DEVICE", and U.S. patent application Ser. No. 12/835,671, filed Jul. 13, 2010, entitled "POSITION-DEPENDENT GAMING, 3-D CONTROLLER, AND HANDHELD AS A REMOTE", each of which is incorporated by reference herein in their entireties for all purposes.

BACKGROUND

The present invention relates to video display in general and, in particular, to overlaying or playing non-video content which is associated with portions of captured video. Many movies and other video content on video discs contain additional content. This additional content often includes behind the scene features, actor/director information, outtakes, subtitles, etc. Typically, much of this additional content is only accessible from the opening menu of the disc, and gets played in isolation and appears out of context from the movie.

Non-video content, such as pure audio, tactile, and olfactory content is traditionally not placed on video discs, save for some audio soundtracks. Much of this type of data is considered too difficult to collect and, even if it were collectible, impossible to link to a movie so that its relation is intuitive to a viewer. Additional video content also poses problems.

Currently, some formats allow a portion of additional content to be placed over the video content during the playing of the video content (e.g., subtitles may be overlaid on the movie while it is being played). However, this overlaid information may interfere with the main picture, and may not be desirable for others watching a movie (e.g., other family members). There may, therefore, be a need in the art to allow additional content to be overlaid on video content for display to one or more individual viewers, without displaying the additional content to all of those watching the video content on the video display.

BRIEF SUMMARY

Generally, methods, systems, and devices are described for providing non-video content, such as audio, tactile, and/or olfactory content, that is supplemental to a movie through a handheld device that is tracking the movie. The non-video content can be used to overlay or supplement video other than movies, such as video from video games. The non-video content can be presented using techniques known in the art for such content. Headphone speakers can present audio data, virtual reality gloves can be used to present tactile content, and chemical syntheses or essential oil collections can be used for olfactory presentation.

There can be an almost infinite amount of non-video content in a scene of a video because there are so many places in which a non-video sensor can be located. Video, on the other hand, is more easily bounded because video is taken from a relatively small number of cameras. Allowing a user to choose a particular portion of a scene, such as the image of an actor portraying a role onscreen, can intuitively narrow the choices one has to select for non-video content. For example, selecting the image of a single actor can allow one to play raw data from his or her lapel microphone, effectively muting others whose voices may be blocking what the actor is saying. In another example, in a botanical garden there are hundreds if not thousands of individual fragrances that could be presented to a user. However, selecting a particular flower or fruit can allow a user to smell the flower or fruit without distraction from other fragrances.

Methods, systems, and devices are also described for providing overlay content to be placed over captured video content for display on a mobile device. In one embodiment, a system includes a video display (e.g., a TV) that displays video content (e.g., a movie) from a video source (e.g., a video disc player or other console device). A mobile device with an integrated video camera and display may capture video data which includes the video content from the video display. The location of the video content within the captured video data may be tracked. The mobile device may access overlay content, and display the accessed overlay content over the tracked video content.

In some embodiments, markers may be used to orient the mobile device with respect to the TV or other display. The markers may include video markers in the video content or physical markers on or relative to the display, or may be any other orienting marker. When the video content is located by the mobile device, the device may display augmented or supplemental content (text, animations, information, etc.) over the view of the video content being displayed on the mobile device. The overlay content may include advertising, or the overlay content may be specific to the video content, and in particular may be specific to the temporal position within the video content. There are various ways to convey the temporal position to the mobile device. For example, the markers may include codes that may be used to identify the video content and temporal position therein, and this information may be used to find the correct overlay content and ensure that this overlay content is properly synchronized with the video content. The overlay content may be obtained by the mobile device from a console device or a network (e.g., a local or remote overlay content database), or may be installed on the mobile device.

Some embodiments include a method for displaying overlay content. Captured video data includes video content from a video display. The video content in the captured video data is tracked. Overlay content is accessed, and displayed over the tracked video content. In one embodiment, the video content is tracked by locating one or more markers in the video content. The video content may be identified, and the overlay content selected based on the identified video content. A temporal position in the video content may be identified as well, and the overlay content selected based on the temporal position in the video content. The video content and/or temporal position may also be identified using the markers.

In some embodiments, a device includes a processor module, a display, and a video camera configured to capture video data including video content from a second video display (e.g., a TV) distinct from the device. Memory on the device may include instructions that, when executed by the processor module, cause the device to track the video content in the captured video data, access overlay content, whether video or non-video, and output the accessed overlay content overlaid on the tracked video content on the device display.

A mobile device may include a video input to capture the video content for display. The video input may be fed by video outputs from a video source used to feed the display(s).

Another set of embodiments includes a method for identifying overlay content. Video data captured with a video camera integrated into a mobile device is received, the video data including video content captured from a video display. The video content captured from the video display is identified, and overlay content to be displayed over the video content is accessed. The overlay content in this set of embodiments is selected based on the identified video content.

Some embodiments include a system for augmenting a video, the system including a video source configured to provide video content to a video display, and a mobile device with an video camera and display. The mobile device is configured to capture video data including the video content from the video display using the video camera, receive a user selection of a subportion of an image in the captured video data, access non-video content associated with the subportion of the image, and present the accessed non-video content associated with the subportion of the image to a user at substantially the same time as the video content is captured using the video camera.

Some embodiments include a computer-implemented method for augmenting video, the method including capturing video data including video content from a video display, the video data captured with a video camera operatively coupled to a mobile device, receiving a user selection of a subportion of an image in the captured video data, accessing non-video content associated with the subportion of the image, and present the accessed non-video content associated with the subportion of the image to a user at substantially the same time as the video content is captured with the video camera.

Some embodiments include a computer-implemented method for augmenting video, the method including receiving video data captured with a video camera operatively coupled with a mobile device, the video data including video content captured from a video display, identifying the video content captured from the video display, and accessing non-video content to be presented to a user substantially at the same time as the video content, the non-video content selected based at least in part on the identified video content.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
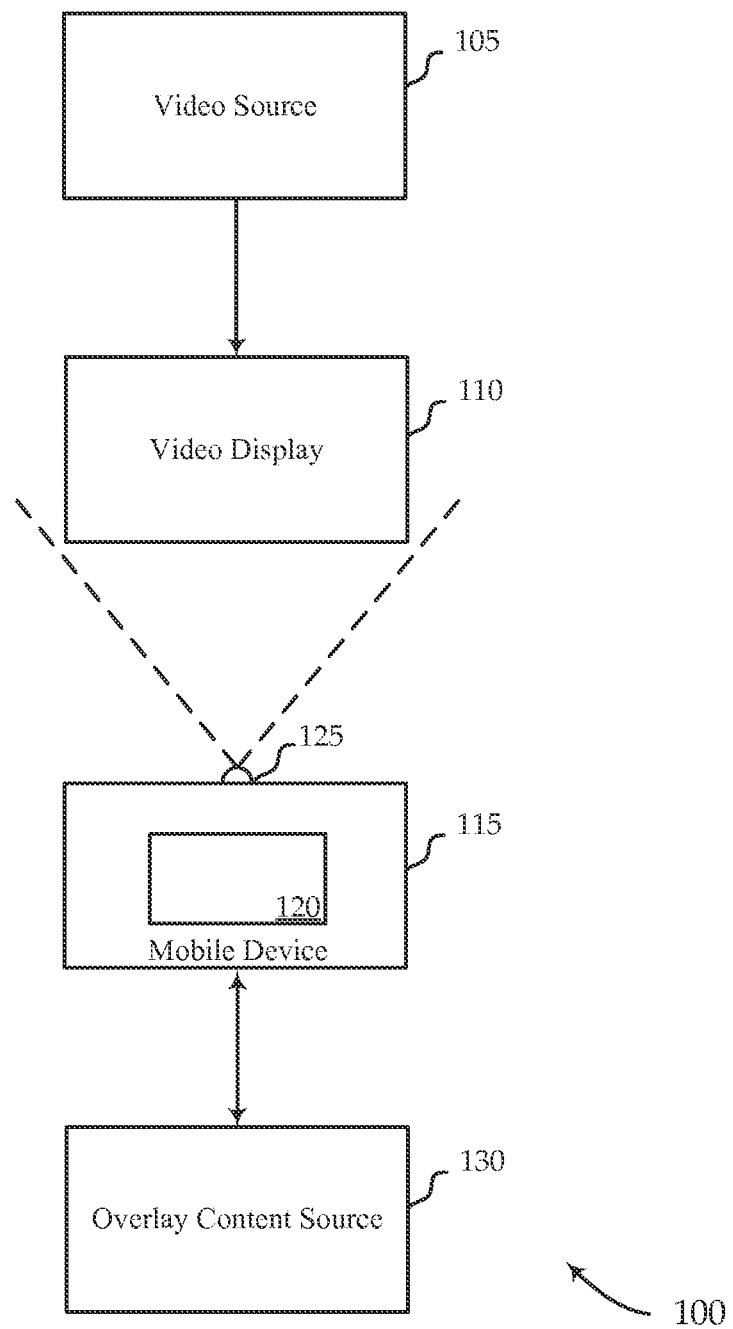
FIG. 1 is a block diagram of a system to provide overlay content on a mobile device according to various embodiments of the invention.

In general, methods, systems, and devices are described for providing non-video content, such as audio content, tactile content, and/or olfactory (i.e., related to the sense of smell) content that is supplemental to a movie, video game, or other video through a handheld device that tracks the video. The non-video, 'extra' content can be presented at substantially the same time as the main content of the video is played. Audio data can be presented using speakers, tactile content can be presented using virtual reality devices, and olfactory content can be presented using chemical synthesis or essential oils as are known in the art.

Extra non-video content for a motion picture can be made available on a DVD through its 'bonus features' menus. A user can enable the selection of non-video content in the menus, and then during the movie, the user can select certain active objects within a scene to enable playback of the non-video content. For example, a user can select a particular actor in a scene in order to better hear what the actor is saying or smell what the actor smells at that point in the movie. In a video game, non-video content can be similarly enabled by selecting a character or other object. An avatar's grabbing a powerful sword can result in the identification of extra non-video content, such as temperature cooling the player's grip on a joystick so that the grip feels more like a cold metal sword.

Embodiments can be used for virtual sight-seeing, in order to feel a selected climate or the wind blowing over a landscape. Temperature information can be stored and then replicated in a virtual environment, presented during a video of the scene. Embodiments can be used for virtual forensics, assisting investigators with determining what a crime scene was like at the time of a crime. Users can select what they touch so that they are directing their own experience within an experience of a video.

Some embodiments allow one to touch and feel fabric while shopping or when a background display in a movie appeals to him or her. For example, one can select a particular jacket from a rack of jackets in a movie and 'feel' the fabric using virtual methods. A costume designer can add supplemental material to a DVD, or an advertiser can add electronic data to store virtual scents. This can not only help the movie immerse one's senses in its environment, but it can help advertisers market products that are placed in the movie.

Methods, systems, and devices are also described for providing overlay data to be placed over captured video content for display on a mobile device. In one embodiment, a system includes a video display that displays video content (such as a movie) from a video source (e.g., a video disc player). A mobile device with an integrated video camera may capture video data, which includes the video content from the video display. The location of the video content within the captured video data may be tracked. The mobile device may access overlay content, and display the accessed overlay content over the tracked video content.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, devices, methods, and software are described for the display of overlay content. In one set of embodiments, shown in FIG. 1, the system 100 includes a video source 105, video display 110, mobile device 115, and overlay content source 130. Each of these components of the system 100 may be in connection with each other (either directly, wirelessly, via a wired or wireless network, etc.). The mobile device 115 includes a display 120 and a video camera 125.

The video source 105 may be a video disc player, a video game console, the Internet, a cable headend, or another video source. The video source 105 transmits video content to the video display 110. In some embodiments, the video source 105 and the overlay content source 130 may be, in whole or in part, the same device or system. As noted, the connection between the video source 105 and video display 110 may be direct, or via a network connection. The video display 110 may be a TV, video monitor (e.g., a liquid crystal display or plasma display), or other video display. The video content may, for example, be a movie, TV show, video game, web content, or other form of video content.

As noted, the mobile device 115 includes an integrated video camera 125 and display 120. The video camera 125 may be an outward facing camera on a mobile device 115, facing the opposite direction from the display 120, or in another direction as applicable. The mobile device 115 may be a mobile phone, personal digital assistant (PDA), portable video player, portable multimedia player, portable digital video disc (DVD) player, laptop PC, portable game console, game controller, video camera, or other digital electronic device.

The video camera 125 captures video data, and the video data includes the video content from the video display 110. Thus, the captured video data may include additional video surrounding the captured video content of the video display 110. The mobile device 115 tracks the video content within the captured video data. The mobile device 115 accesses overlay content, and displays the accessed overlay content over a portion of the tracked video content or anywhere on the mobile device display 120.

To track the video content, the mobile device 115 may identify the size of the video content, and the position and orientation of the video content relative to the mobile device (or position and orientation of the mobile device 115 relative to the display). In some embodiments, the video content displayed on the video display 110 includes one or more markers formatted to allow the mobile device 115 to track the video content within the captured video data. The marker may be placed in the corners of the video content, and could be a pattern of dots or squares (akin to a barcode). A variety of on-screen markers may be used (e.g., codes, graphics, numbers, letters, digital watermarks, or encoded images). Encoded audio may also be used to serve as markers. The video display 110 itself, or attachment thereto, may also serve as a marker.

The markers may have other functionality, alternatively or in addition to serving as anchors for tracking Each pattern in a marker may represent a different value, such as a different binary representation. There may be one or more values associated with each marker in video content. The mobile device 115 may capture video content, locate the marker, and identify the value. Therefore, the video content displayed on the video display 110 may include a marker identifying the video content. The mobile device 115 may identify the video content based on markers, and the overlay content (e.g., text, animations, graphic enhancements (e.g., 2D or 3D enhancements), advertisements, hyperlinks, and other information) may be selected based on an identification of the video content.

Some of the values associated with video content may change in a given marker over time. The video content displayed on the video display 110 may therefore include a marker identifying the temporal position within particular video content. Since video changes over time, a time code may allow the overlay content to be synchronized with the movie or other video content. The mobile device 115 may process the marker to identify the temporal position within the video content. The overlay content may be selected in response to the temporal position of the video content (e.g., tied to particular scenes, actors, etc.). Thus, the pattern or the marker may change over time to show time progression, status, or other time-variable indicators. This may allow a mobile device 115 to get a tight synchronization with the video content on the video display 110. There may, but need not be, communication between the video source 105 and mobile device 115 for purposes of synchronization. Codes could update at a variety of rates, by way of example: 24 frames per second, or every ¼ second, every three seconds, etc., up to 10-15 seconds or more, depending upon the type of information to be displayed. The mobile device 115 may know the intervals in advance, so once there is synchronization, the mobile device 115 may only need to perform search processing at the intervals.

Figure 2:
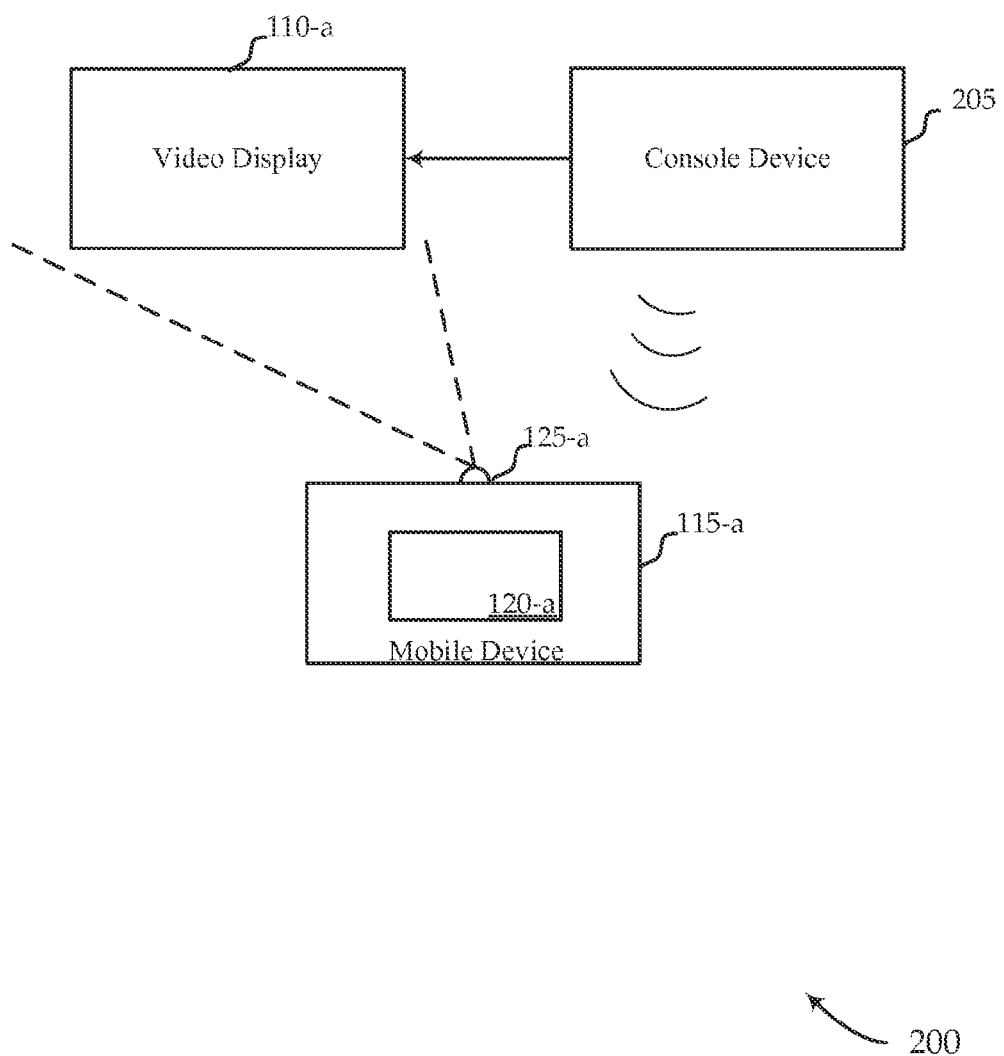
FIG. 2 is a block diagram of a system to provide overlay content to a mobile device delivered from a console device according to various embodiments of the invention.

In another set of embodiments, shown in FIG. 2, a system 200 includes a console device 205, video display 110-*a*, and mobile device 115-*a*. This system 200 may be an example of the system 100 of FIG. 1. The console device 205 may, for example, be a video disc player or a video game console (and may be the video source of FIG. 1). In one embodiment, the console device 205 is directly connected with the video display 110-*a*. The console device 205 may be in wireless communication with the mobile device 115-*a*. The mobile device 115-*a* includes a display 120-*a* and a video camera 125-*a*.

Consider an example wherein the console device 205 is playing a video disc, and transmitting video content from the disc for display over the video display 110-*a*. The video camera 125-*a* captures video data, and the video data includes the video content from the video display 110-*a*. The mobile device 115-*a* tracks the video content within the captured video data. The mobile device 115-*a* receives overlay content wirelessly from the console device 205, and displays the accessed overlay content over at least a portion of the tracked video content on the mobile device display 120-*a*.

Thus, in some embodiments, the console device 205 has augmented overlay content (which may be on the video disc itself, or accessed remotely over a network). Because the console device 205 provides both the video content to be displayed and overlay video content, this may facilitate the identification and temporal position of the video content (e.g., without the use of markers). In some embodiments, the mobile device 115-*a* may control or otherwise select the particular type of overlay content to be displayed on the mobile device display 120-*a*.

Figure 3:
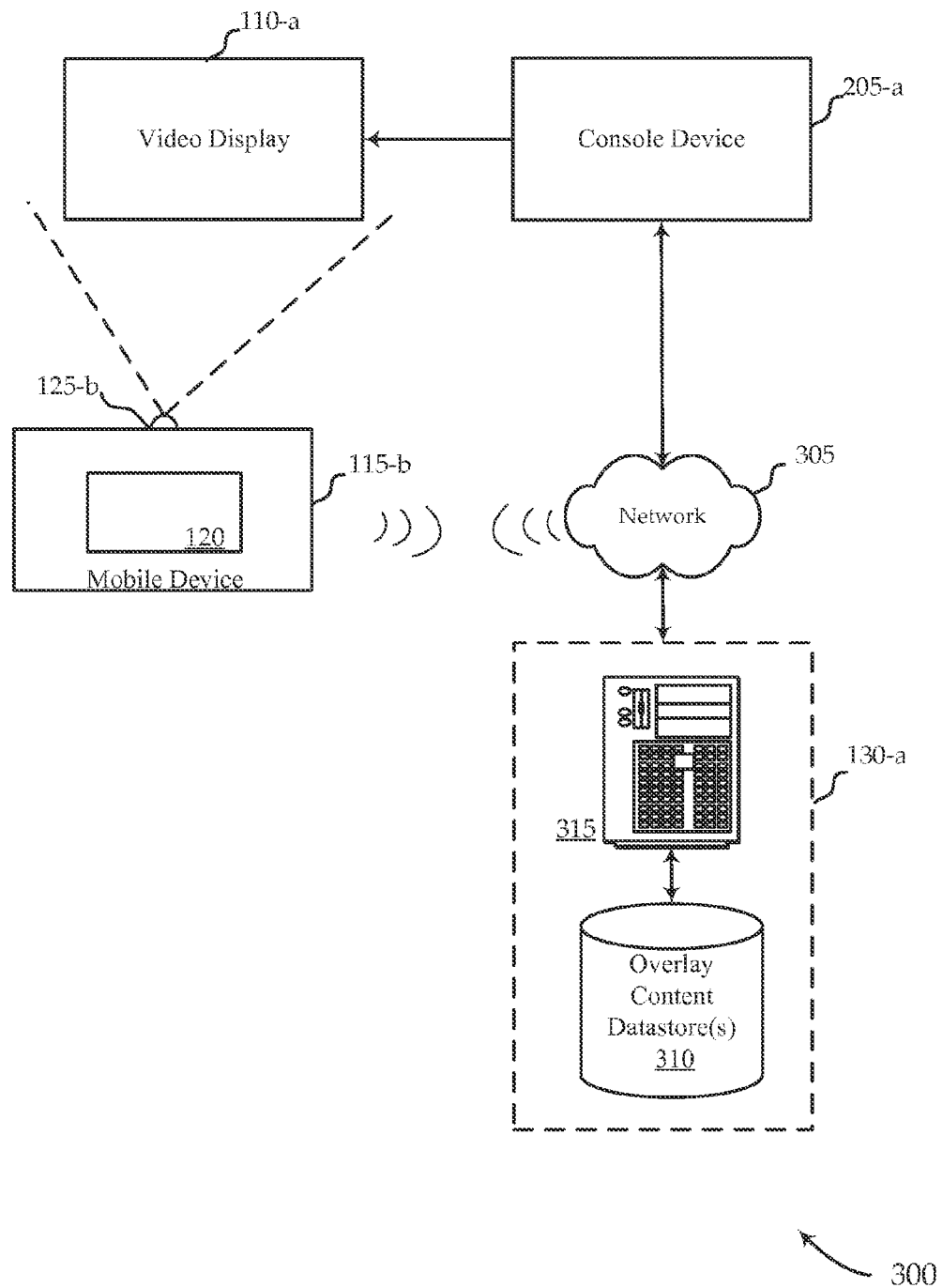
FIG. 3 is a block diagram of a system to provide overlay content to a mobile device delivered from an overlay content datastore according to various embodiments of the invention.

In another set of embodiments, shown in FIG. 3, a system 300 includes a console device 205-*a*, a video display 110-*a*, a mobile device 115-*b*, a network 305, overlay content datastore(s) 310, and an overlay content server 315. This system 300 may be an example of the system 100 of FIG. 1 (e.g., overlay content datastore(s) 310 and overlay content server 315 may be an overlay content source 130-*a*, such as the overlay content source 130 of FIG. 1). In one embodiment, the console device 205-*a* is directly connected with the video display 110-*a*. The mobile device 115-*a* may be wirelessly connected to a network 305, and in communication with overlay content datastore(s) 310 and overlay content server 315 through the network 305. The console device 205-*a* may be in communication with the network 305, and in communication with overlay content datastore(s) 310 and overlay content server 315 through the network 305.

In one example, the console device 205-*a* is playing a video disc, and transmitting video content from the disc for display over the video display 110-*a*. The video camera 125-*b* captures video data, and the video data includes the video content from the video display 110-*a*. The mobile device 115-*b* tracks the video content within the captured video data. The mobile device 115-*b* accesses overlay content via the network 305 from overlay content datastore(s) 310 and overlay content server 315. The mobile device 115-*b* displays the overlay content over at least a portion of the tracked video content on the mobile device display 120.

The overlay content may be related, or unrelated, to the video content. For example, in some embodiments, the overlay content is an advertisement (e.g., text, animations, graphics, hyperlinks, or other information) that is unrelated or independent from the video content. In other embodiments, the video content may be known (e.g., identified via console device 205-*a* or mobile device 115-*b* transmission to the overlay content server 315), but the temporal position may be unknown. The overlay content server 315 may deliver non-time specific overlay content to the mobile device 115-*b*.

In still other embodiments, the overlay content server 315 may identify the temporal position of the video content. This may be learned via communication with the console device 205-*a*, or the mobile device 115-*b* (e.g., the mobile device 115-*b* may transmit information to the overlay content server 315 from the markers discussed in more detail elsewhere). The overlay content server 315 accesses the overlay content datastore(s) 310 to retrieve overlay content related to the video content being captured by the mobile device 115-*b*. This content may be delivered to the mobile device 115-*b* for overlay during time-specific portions of the video content. It is also worth noting that overlay content may be pre-loaded onto the mobile device 115-*b* (e.g., from local or remote storage, such as the overlay content datastore(s) 310).

The overlay content server 315 may include one or more server computers, workstations, web servers, or other suitable computing devices. The overlay content server 315 may be fully located within a single facility or distributed geographically, in which case a network may be used to integrate different components.

Figure 4:
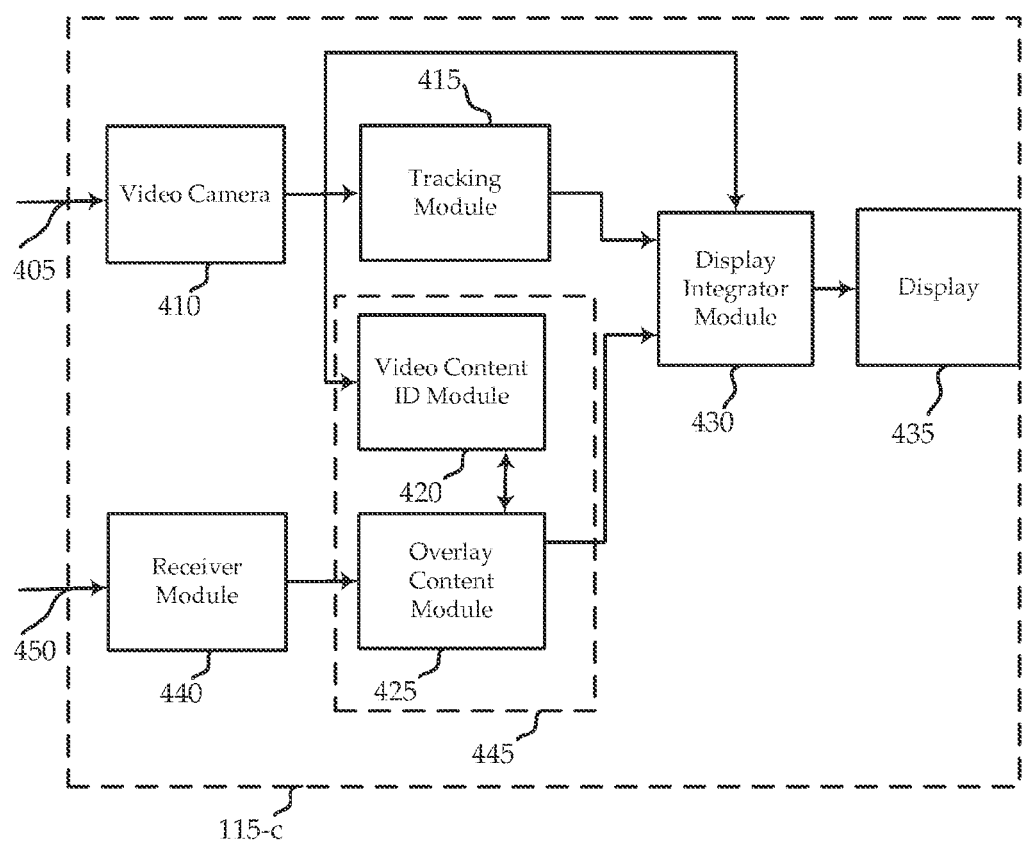
FIG. 4 is a block diagram of a mobile device configured to display overlay content over captured video content according to various embodiments of the invention.

FIG. 4 is a block diagram 400 illustrating a mobile device 115-*c* for the display of overlay content according to various embodiments of the invention. This may, but need not be, the mobile device 115 of FIG. 1, 2, or 3. The mobile device 115-*c* may include a video camera 410, tracking module 415, video content ID module 420, overlay content module 425, display integrator module 430, display 435, and receiver module 440. In some embodiments, a mobile device 115-*c* may include only a subset of these components, and it is further worth noting that some of the functionality discussed may be performed by other devices in communication with the mobile device 115-*c*..

All or part of the functionality of each component may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions may also be implemented, in whole or in part, with instructions embodied in a memory, formatted to be executed by one or more general or application-specific processors.

Video content 405 being displayed on a TV or other display device may be captured by the video camera 410. The tracking module 415 may track the video content within the captured video. The tracking module 415 may track the video content by identifying the size and location of the video content within the captured video data, and the position and orientation of the video display relative to the mobile device. This tracking may be performed using the markers discussed elsewhere herein.

Video can also be captured directly from output ports using cables connected to the output ports of the source. Captured video may be in analog, digital, or hybrid analog/digital formats. Captured video may be fed directly to the tracking module 415, bypassing the video camera 410.

The video content ID module 420 may decode the markers, or otherwise identify the captured video content. In some embodiments, the video content ID module 420 also identifies the temporal position within video content. The overlay content module 425 accesses overlay content. The accessed overlay content may be tied to the video content, and further may be tied to the temporal position within the video content. In some embodiments, there are a number of overlay content options at a given temporal position. The video content ID module 420 and the overlay content module 425 (and tracking module 415) may be an integrated module 445; alternatively, some or all of this functionality may be located off the mobile device 115-*c* (see, e.g., the discussion of the overlay content datastore(s) 310 and overlay content server 315 of FIG. 3). Thus, the receiver module 440 of the mobile device 115-*c* may receive overlay content 450 (in advance or in real-time). This overlay content may be received from a local console device (e.g., console device 205 of FIG. 2) or from a local or remote overlay content datastore (e.g., datastore 310 of FIG. 3).

The display integrator module 430 receives the video captured by the video camera 410, or through direct output cables from the video source, and information on location, size, position, and/or orientation of the video content from the tracking module 415. The display integrator module 430 receives the overlay content from overlay content module 425. The display integrator module 430 may scale and orient the overlay content. The display integrator module 430 overlays the accessed overlay content over at least a portion of the tracked video content, and forwards the integrated video to the display 435.

There is a variety of overlay content that may be provided, including actor identification and information, location background, trivia, player statistics, fantasy information, quizzes, hidden "easter eggs" to be discovered, links to multiple angles, and any other bonus features. These may be in the form of text, animations, graphic enhancements (e.g., 2D or 3D enhancements), advertisements, hyperlinks, etc.

Figure 5:
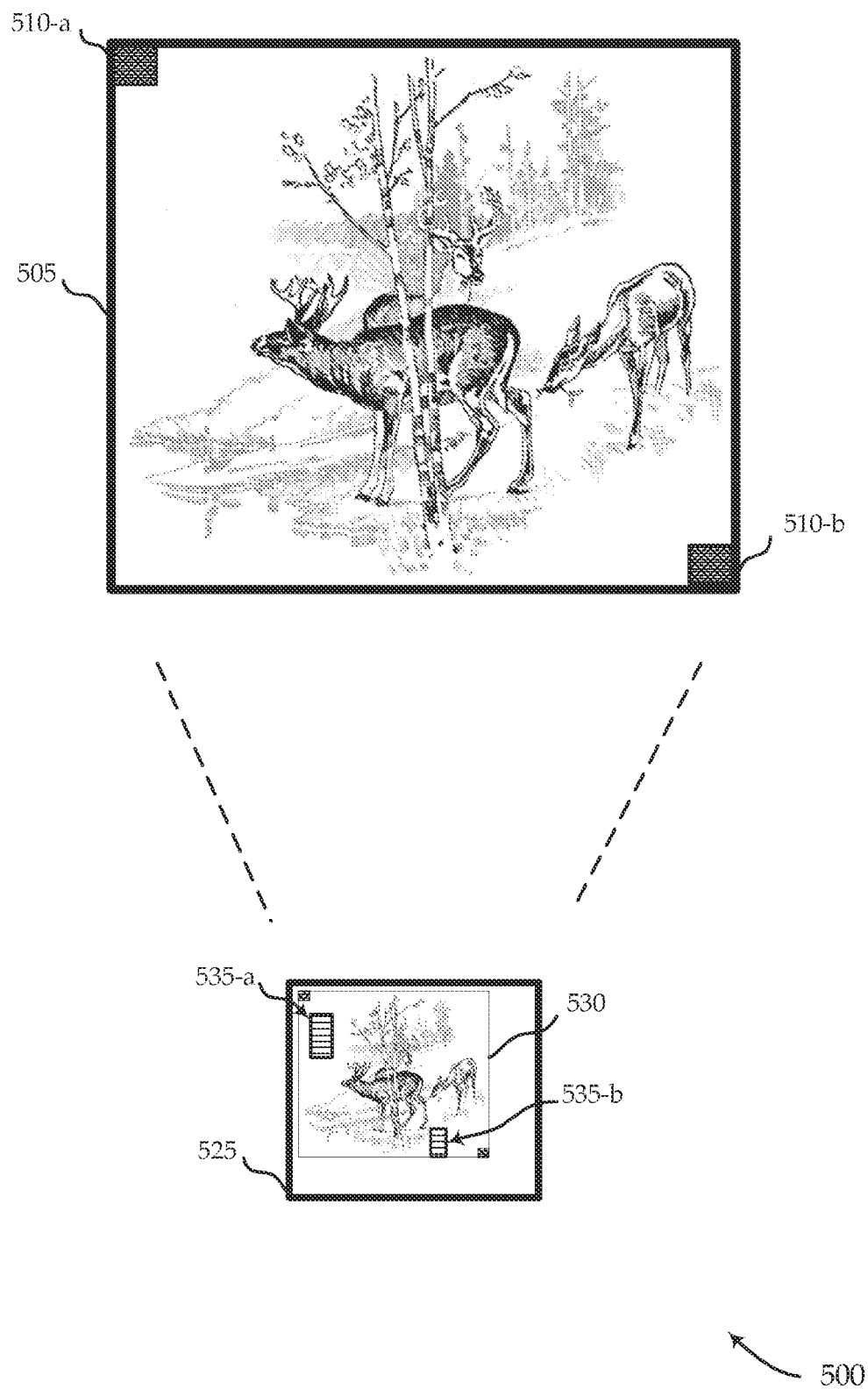
FIG. 5 is a diagram illustrating the display of overlay content over captured video content according to various embodiments of the invention.

Turning to FIG. 5, an example set of images 500 illustrating various displays are used to show various novel aspects. Assume that image 505 is video content on a display (e.g., the video display 110 of FIG. 1, 2, or 3). In the image 505, there are markers 510 placed in certain corners. As noted above, the markers 510 may be a pattern of dots or squares (akin to a barcode). However, in other embodiments, a variety of on-screen markers may be used (e.g., codes, graphics, numbers, letters, digital watermarks, or encoded images). The markers 510 may have other functionality, alternatively or in addition to serving as anchors for tracking Each pattern in a marker 510 may represent a different value, such as a different binary representation. There may be one or more values associated with each marker 510 in video content, and the markers may be changed over time to identify temporal position in addition to content.

Image 525 illustrates captured video, while image 530 (within image 525) illustrates the captured video content from a video display (i.e., the captured image 505). The markers 510 may be processed to track image 530 within image 525, and may further be processed to identify the video content and the temporal position therein. Based on one or more of the aforementioned factors, overlay content 535 may be selected. As noted previously, the overlay content may be text, animations, graphic enhancements (e.g., 2D or 3D enhancements), advertisements, hyperlinks, and so on. The overlay content may automatically appear in some embodiments, while in other embodiment the content is user-selectable.

Figure 6A:
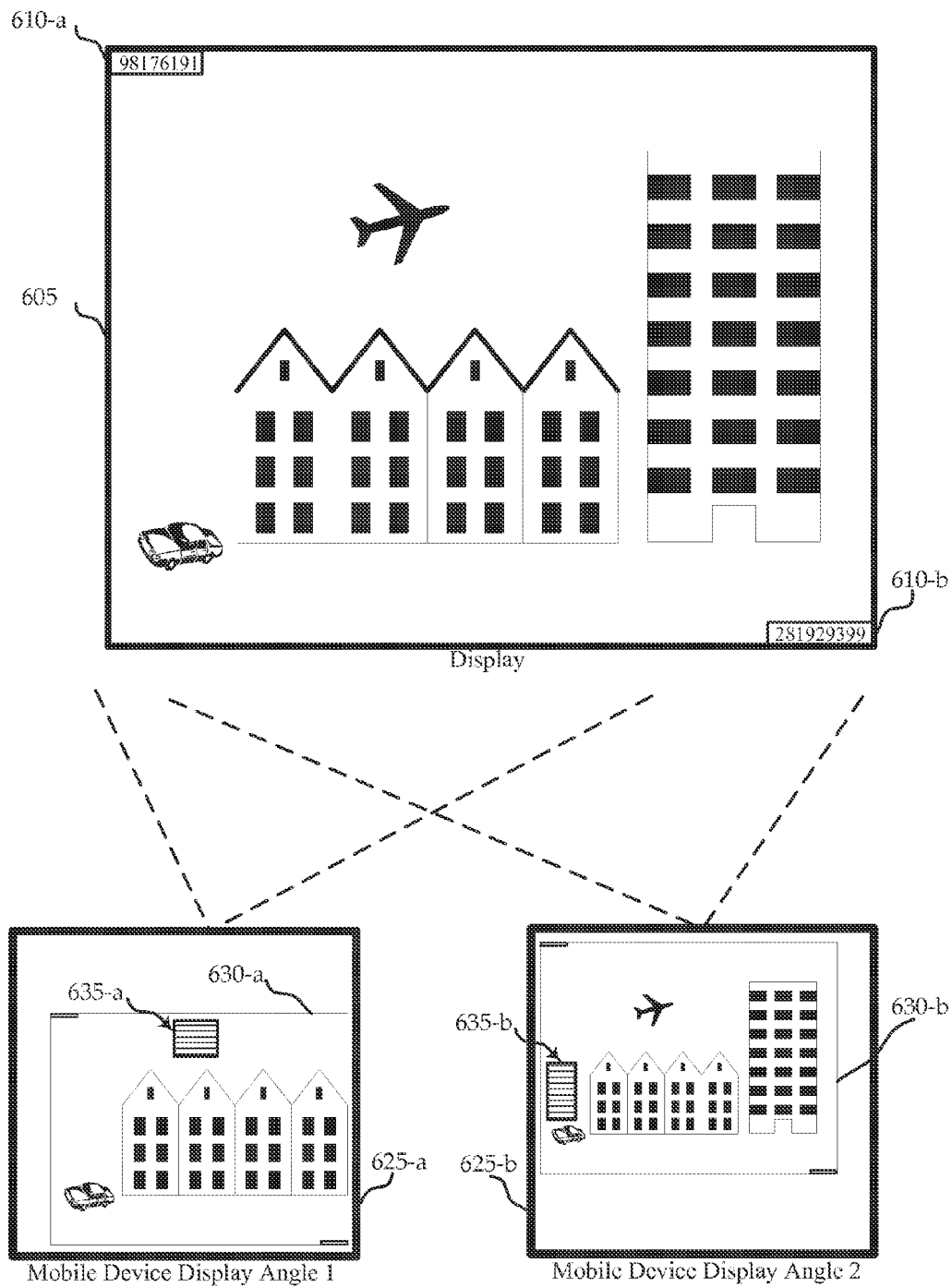
FIG. 6A is a diagram illustrating various displays of overlay content over captured video content according to various embodiments of the invention.

Turning to FIG. 6A, an example set of images 600 illustrating various displays are again used to show various novel aspects. Assume that image 605 is video content on a display (e.g., the video display 110 of FIG. 1, 2, or 3) or fed through output connections from a video source or the display. In the image 605, there are markers 610 identifying decimal codes placed in certain corners. As noted above, the markers 610 may, in other embodiments, be a variety of different screen markers. The markers 610 may have other functionality, alternatively or in addition to serving as anchors for tracking Each code 610 may represent a different value to identify video content, and codes may change over time as well.

Images 625-*a* and 625-*b* illustrate captured video for different mobile devices capturing video from different angles and zooms, while images 630-*a* and 630-*b* illustrate the captured video content from a video display (i.e., the captured image 605). The markers 610 may be processed to track images 630-*a* and 630-*b* within images 625-*a* and 625-*b*, respectively. Different angles may be associated with different overlay content. For example, compare the position of overlay content 635-*a* with overlay content 635-*b*. In addition to providing different overlay content based on viewer angles, user-specific overlay data may also be provided. For example, different users may specify (through pre-selected preferences or real-time selection) which type of overlay content they would like to receive.

Figure 6B:
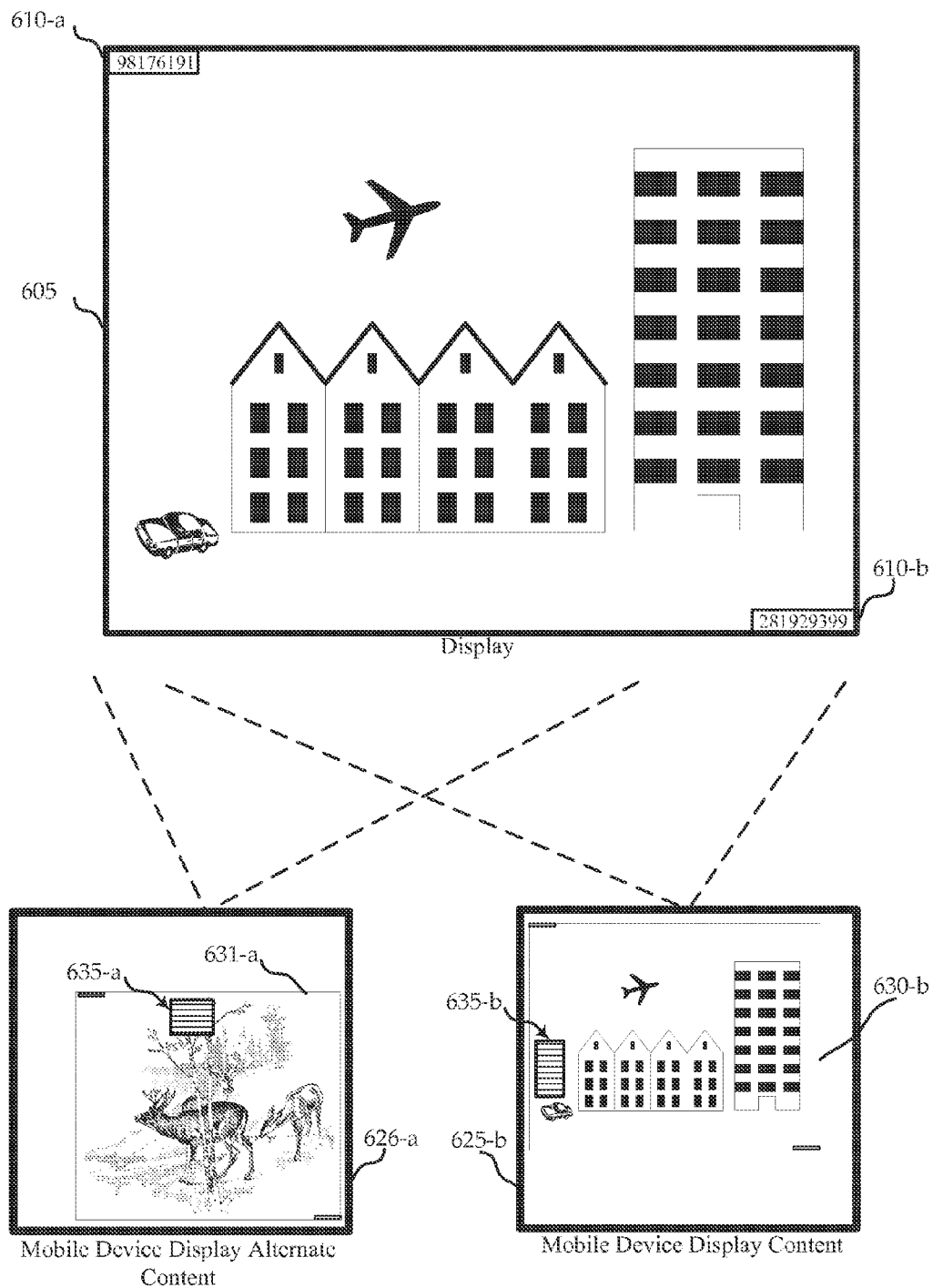
FIG. 6B is a diagram illustrating various displays of overlay content over non-related video content according to various embodiments of the invention.

FIG. 6B includes different, unrelated content on image 626-*a* of the left mobile device display. Overlay content 635-*a* is the same as in FIG. 6A, as it is based on content of display 605. Overlay content 635-*a* is overlaid over image 631-*a*, which is unrelated to the content of display 605. This can occur when a commercial is playing on image 605 and the viewer of the mobile device display wishes to watch another video but keep overlays for the main content available.

There are a number of additional ways to track video content within captured video, identify the video content, and/or identify the temporal position therein. For example, in some embodiments, a mobile device (e.g., mobile device 115 of FIG. 1, 2, 3 or 4) may have a low-resolution version of a movie, and search for those frames in order to sync to the movie. A hash of a low-resolution version of the movie may be stored at the device, and the device may perform image matching. The image matching can also be performed on a remote server or a video source, such as console device 205.

In other embodiments, an "invisible" watermark may be embedded in the video stream to provide for tracking and content identification. A digital watermark embedded in the content may be captured by a mobile device, and used to track the video content. The watermark may be in select, predictable areas of the screen, or across the entire screen to facilitate tracking to determine the outline of the screen in the image. In one embodiment, there are two watermarks, or mark portions, on the screen—one that corresponds to the anchor (e.g., a static mark that may be around or near the edge and stable), and one that corresponds to the code (e.g., changing over time—a modulated mark).

In some embodiments, the tracking and content identification may be embedded in the image. A Fourier transform of all or part of the scanned image may be performed, and the frequencies across the image analyzed. Information may be encoded in portions of the image not perceptible to humans (e.g., very high frequency images). Information may be embedded that relates to a watermark (e.g., defining the location of a watermark), or is independent from any watermark.

In still other embodiments, the tracking and content identification may be embedded in subtitles, logos, or other images. The information may also be in the sidebands of the audio, encoded at frequencies not perceptible to the human ear, but that can be detected using, for example, a Fourier transform. Combinations of image data and audio data may be used, as well. It is again worth noting that markers may be used to track the display, identify video content, and identify a temporal position. However, in some embodiments, the video content is not identified with the markers, and instead the overlay content may be independent of the video content (e.g., with an advertisement). Instead, the marker may dictate an advertising logo to display and a size/location of where to display it on the screen.

The markers may not be needed in each embodiment, as a mobile device may recognize and track the display in other ways (e.g., based on knowing a model and/or size of the display). In some embodiments, a sensor bar, stickers, or other physical attachments may be used to track the display. In other embodiments, the markers may be embedded in an extra angle or secondary version, as opposed to having the marker always embedded. Thus, a person who does not want the augmented experience may select the version without markers in such embodiments.

It is again worth noting that the overlay content may be downloaded in advance of when the video content is displayed (e.g., through a download store, or by copying content from the movie's video disc). Alternatively, some console devices may stream the overlay content to a mobile device over a wireless connection during the playback of the content and thus avoid preloading the portable device with the content. This can also be used as a method of synchronization. In still other embodiments, the overlay content may be streamed from a network.

Figure 7:
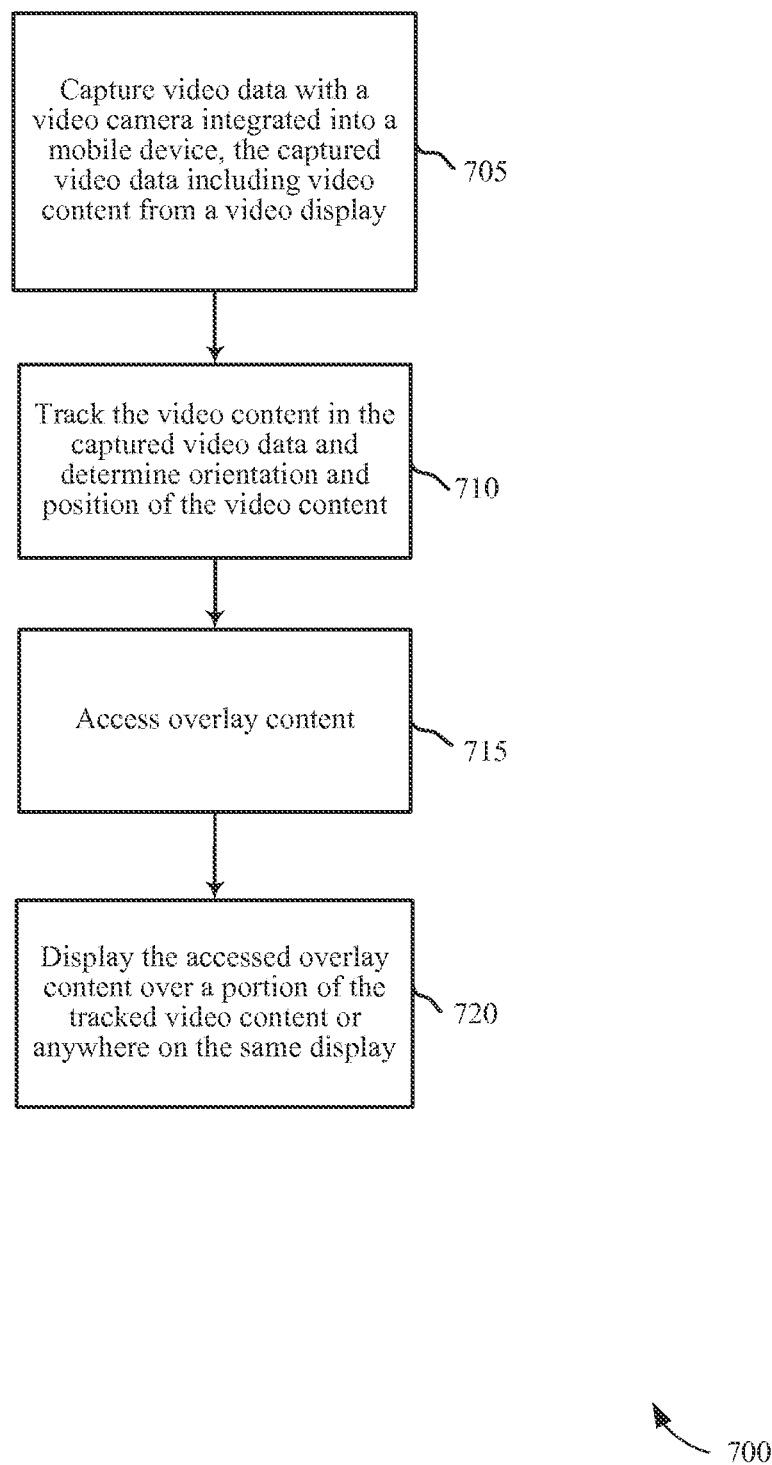
FIG. 7 is a flow chart of a process to provide overlay content on a mobile device according to various embodiments of the invention.

Referring next to FIG. 7, a flow chart is shown illustrating a method 700 to provide overlay content on a mobile device according to various embodiments of the invention. This method 700 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof At block 705, video data is captured by a video camera integrated into a mobile device, the captured video data including video content from a video display. At block 710, the video content in the captured video data is tracked. At block 715, overlay content is accessed. At block 720, the accessed overlay content is displayed over at least a portion of the tracked video content on the mobile device display.

Figure 8:
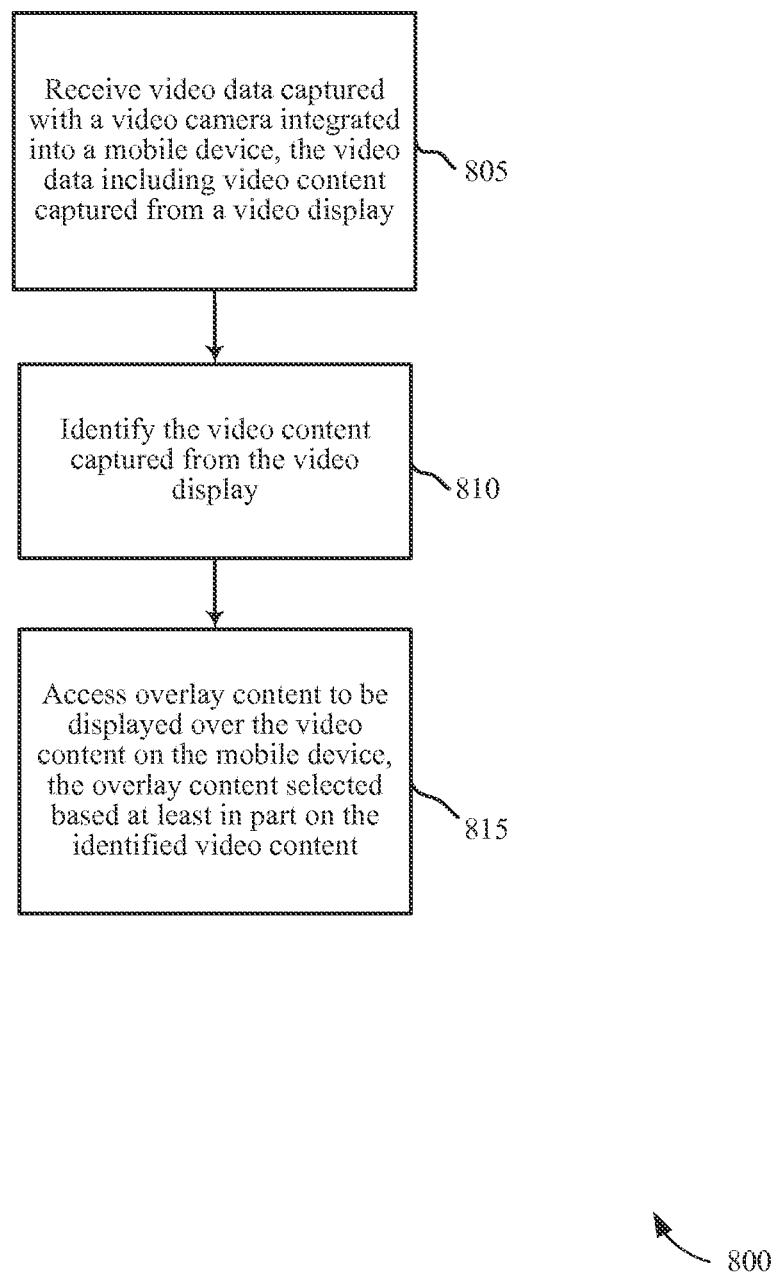
FIG. 8 is a flow chart of a process to identify overlay content for display on a mobile device according to various embodiments of the invention.

Referring next to FIG. 8, a flow chart is shown illustrating a method 800 to identify overlay content for display on a mobile device according to various embodiments of the invention. This method 800 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof.

At block 805, video data captured with a video camera integrated into a mobile device is received, the video data including video content captured from a video display. At block 810, the video content captured from the video display is identified. At block 815, overlay content to be displayed over the video content is accessed, the overlay content selected based at least in part on the identified video content.

In some embodiments (not shown), the temporal position within the video content is identified, and the overlay content is further selected based on the temporal position. The video content within the captured video data may also be tracked, and the tracking may include identifying the relative position and orientation of the mobile device as it relates to the video content.

Figure 9:
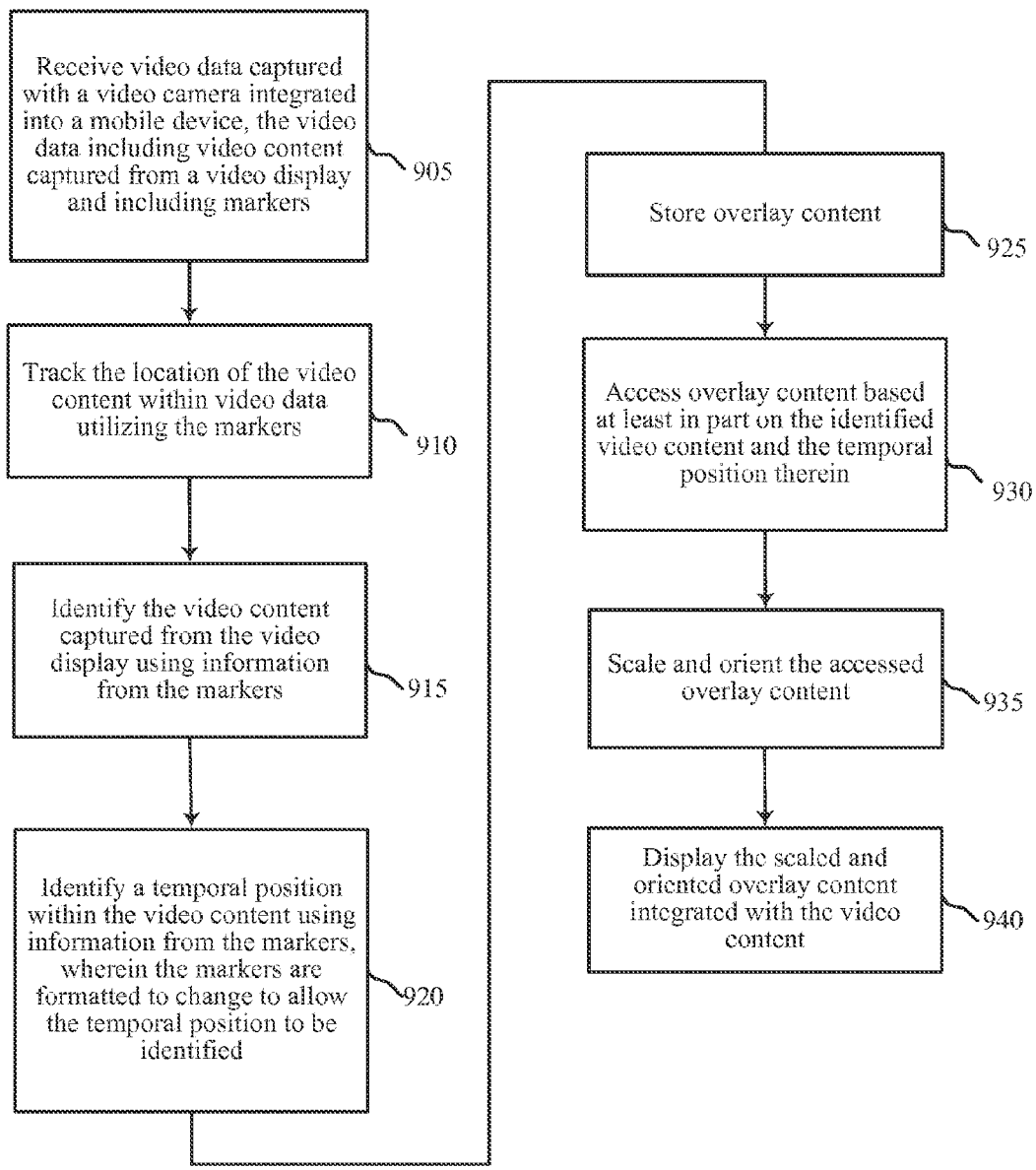
FIG. 9 is a flow chart of a process to identify overlay content for display on a mobile device over tracked video content according to various embodiments of the invention.

Referring next to FIG. 9, a flow chart is shown illustrating a method 900 to identify overlay content for display on a mobile device over tracked video content according to various embodiments of the invention. This method 900 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof At block 905, video data captured with a video camera integrated into a mobile device is received, the video data including video content captured from a video display and including markers. In other embodiments, video data may be captured directly from analog, digital, or hybrid analog/digital outputs from a video source. At block 910, the location of the video content is tracked within the video data utilizing the markers. At block 915, the video content captured from the video display is identified using information from the markers. At block 920, a temporal position is identified within the video content using information from the markers, wherein the markers are formatted to change to allow the temporal position to be identified.

At block 925, overlay content is stored. At block 930, overlay content is accessed based at least in part on the identified video content and the temporal position therein. At block 935, the accessed overlay content is scaled and oriented. At block 940, the scaled and oriented overlay content is integrated with the video content and displayed.

Figure 10:
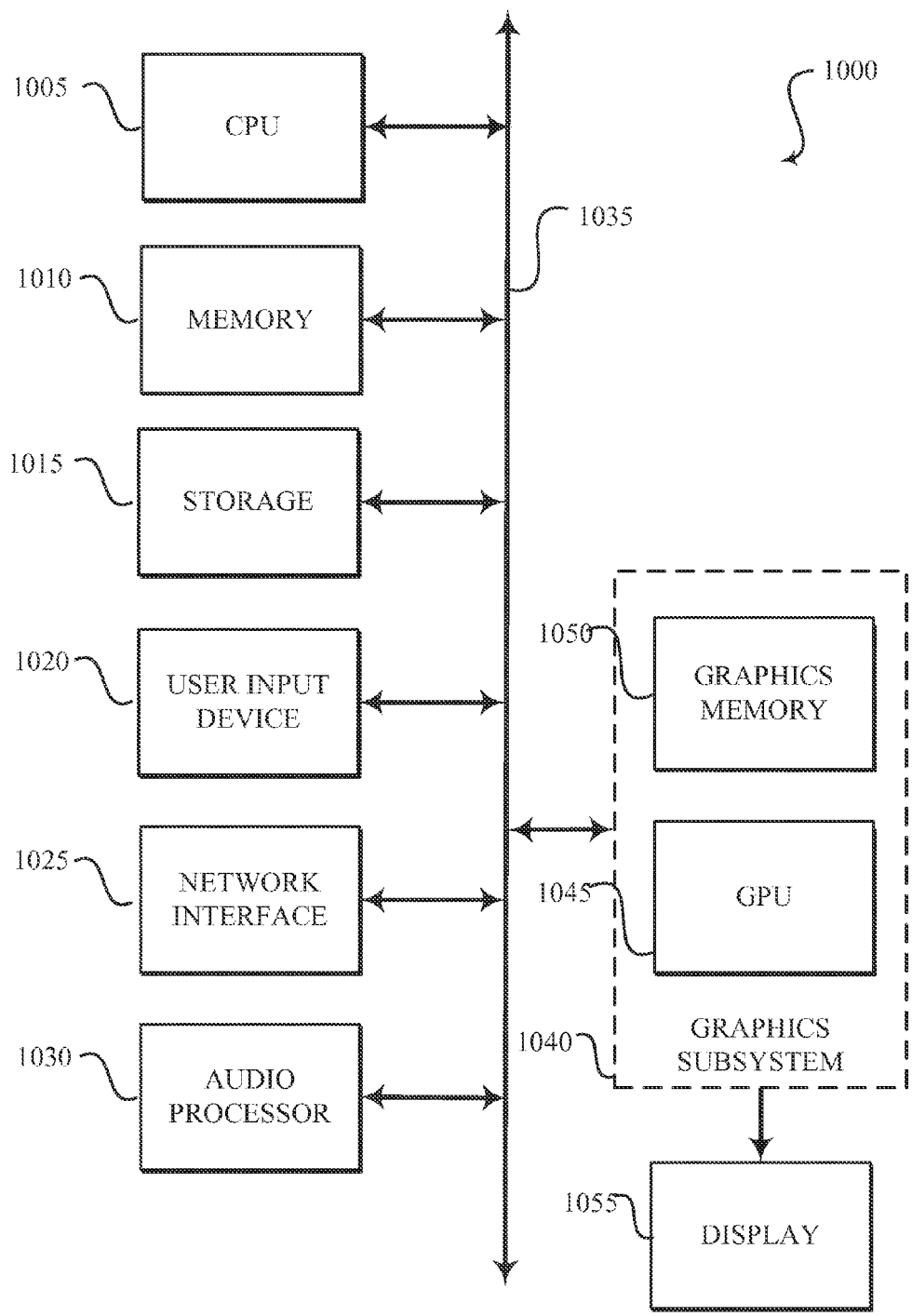
FIG. 10 illustrates components of an example device that can be used to perform aspects of the various embodiments.

FIG. 10 illustrates an example of a hardware system suitable for implementing a device in accordance with various embodiments. This block diagram illustrates a computer system 1000, such as a personal computer, video game console and associated display (e.g., console device 205 and video display 110 of FIG. 2, mobile device (e.g., mobile device 115 of FIG. 1, 2, 3, or 4), personal digital assistant, or other digital device, suitable for practicing embodiments of the invention. Computer system 1000 includes a central processing unit (CPU) 1005 for running software applications and optionally an operating system. CPU 1005 may be made up of one or more homogeneous or heterogeneous processing cores. Memory 1010 stores applications and data for use by the CPU 1005. Storage 1015 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1030 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1030 are connected via one or more data buses 1035.

A graphics subsystem 1040 is further connected with data bus 1035 and the components of the computer system 1000. The graphics subsystem 1040 includes a graphics processing unit (GPU) 1045 and graphics memory 1050. Graphics memory 1050 includes a display memory (e.g., a frame buffer) used for storing pixel data for each pixel of an output image. Graphics memory 1050 can be integrated in the same device as GPU 1045, connected as a separate device with GPU 1045, and/or implemented within memory 1010. Pixel data can be provided to graphics memory 1050 directly from the CPU 1005. Alternatively, CPU 1005 provides the GPU 1045 with data and/or instructions defining the desired output images, from which the GPU 1045 generates the pixel data of one or more output images. The data and/or instructions defining the desired output images can be stored in memory 1010 and/or graphics memory 1050. In an embodiment, the GPU 1045 includes 3D rendering capabilities for generating pixel data for output images from instructions and data defining the geometry, lighting, shading, texturing, motion, and/or camera parameters for a scene. The GPU 1045 can further include one or more programmable execution units capable of executing shader programs.

The graphics subsystem 1040 periodically outputs pixel data for an image from graphics memory 1050 to be displayed on display device 1055. Display device 1055 can be any device capable of displaying visual information in response to a signal from the computer system 1000, including CRT, LCD, plasma, and OLED displays. Computer system 1000 can provide the display device 1055 with an analog or digital signal.

In accordance with various embodiments, CPU 1005 is one or more general-purpose microprocessors having one or more processing cores. Further embodiments can be implemented using one or more CPUs with microprocessor architectures specifically adapted for highly parallel and computationally intensive applications, such as media and interactive entertainment applications.

The components of the system 100 of FIG. 1, system 200 of FIG. 2, or system 300 of FIG. 3 may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

Figure 11:
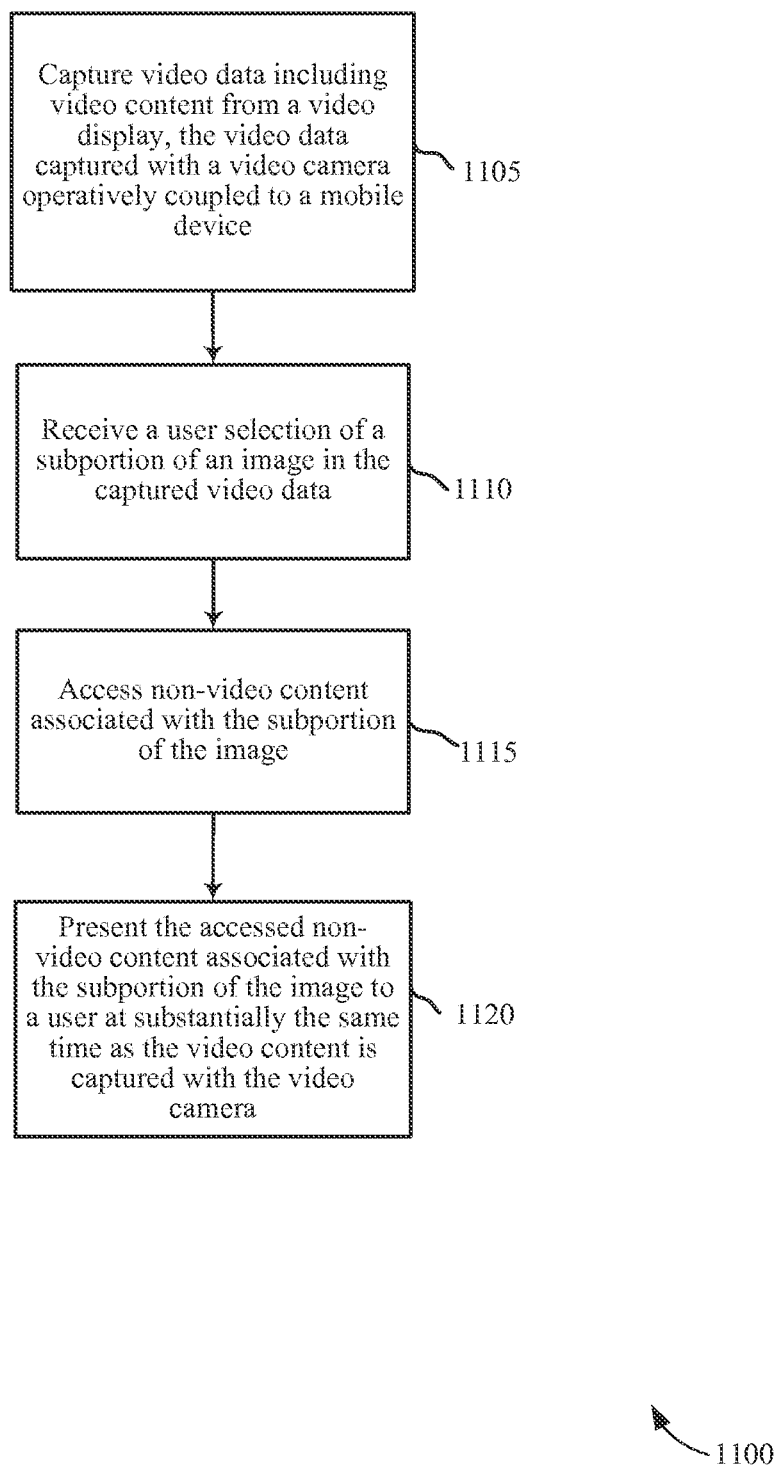
FIG. 11 is a flow chart of a process according to various embodiments of the invention.

Referring next to FIG. 11, a flow chart is shown illustrating a method 1100 to identify non-video content for presentation on a mobile device over tracked video content according to various embodiments of the invention. This method 1100 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof At block 1105, video data on a video display is captured with a video camera operatively coupled to a mobile device, the video data including video content. In other embodiments, video data may be captured directly from analog, digital, or hybrid analog/digital outputs from a video source. At block 1110, a user selection of a subportion of an image in the captured video data is received. At block 1115, non-video content associated with the subportion of the image is accessed. At block 1120, the accessed non-video content associated with the subportion of the image is presented to a user at substantially the same time as the video content is captured with the video camera.

A "subportion" of an image includes a portion of an image that is smaller than the overall image, including the area on the screen depicting an object, such as an actor, vehicle, building, horizon, etc. A subportion can be associated with particular non-video content. For example, a flower in an image can be associated with the scent of a particular flower genus/species and cultivar.

"Substantially the same time" includes times that are within 1, 2, 5, 10, and 30 or more seconds of each other or as otherwise known in the art.

Figure 12:
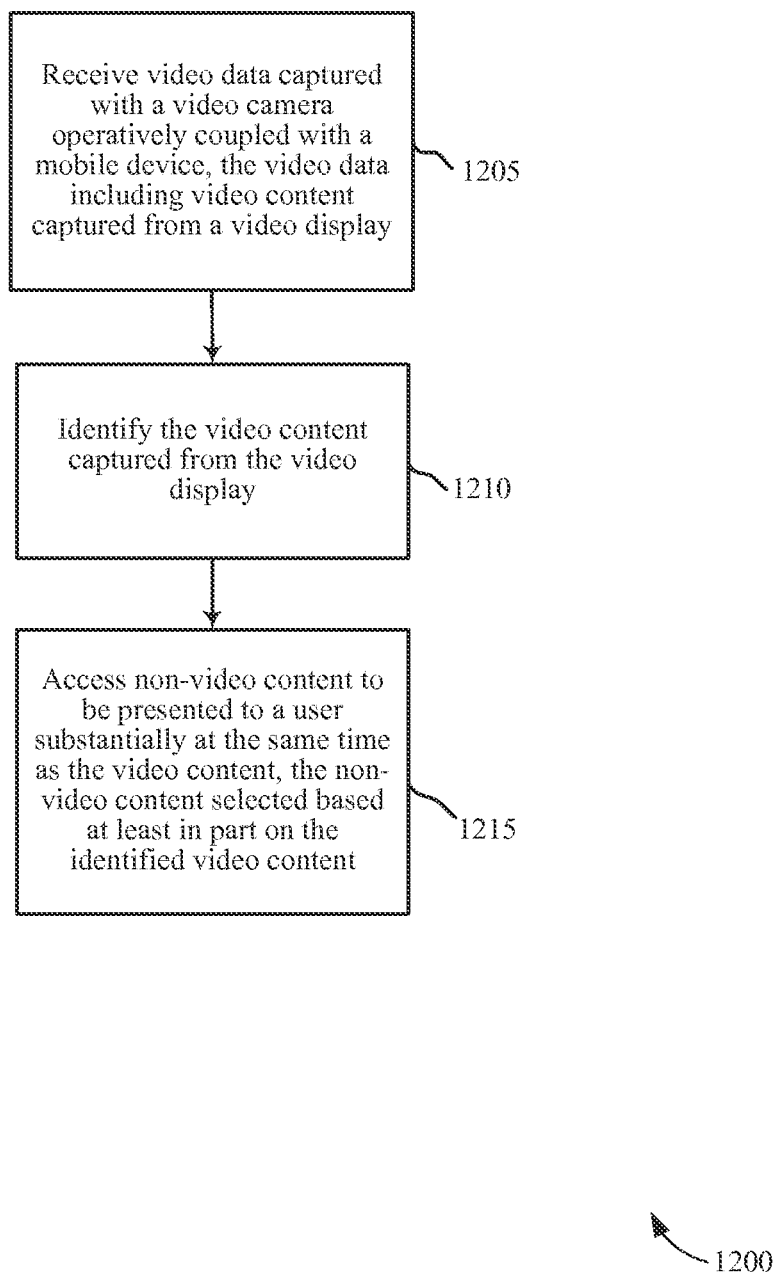
FIG. 12 is a flow chart of a process according to various embodiments of the invention.

Referring next to FIG. 12, a flow chart is shown illustrating a method 1200 to identify non-video content for presentation on a mobile device over tracked video content according to various embodiments of the invention. This method 1200 may, for example, be performed in whole or in part by the system 100, 200, or 300 of FIG. 1, 2, or 3, the mobile device 115 of FIG. 1, 2, 3, or 4, the console device 205 of FIG. 2 or 3, or the overlay content server 315 of FIG. 3, and/or any combination thereof At block 1205, video data captured from a video display with a video camera operatively coupled with a mobile device is received, the video data including video content. In other embodiments, video data may be captured directly from analog, digital, or hybrid analog/digital outputs from a video source. At block 1210, video content captured from the video display is identified. For example, an automatic shape-and-movement detection algorithm can determine that a figure in the image is that of a dog. At block 1215, non-video content to be presented to a user substantially at the same time as the video content is accessed, the video content selected based at least in part on the identified video content.

Figure 13:
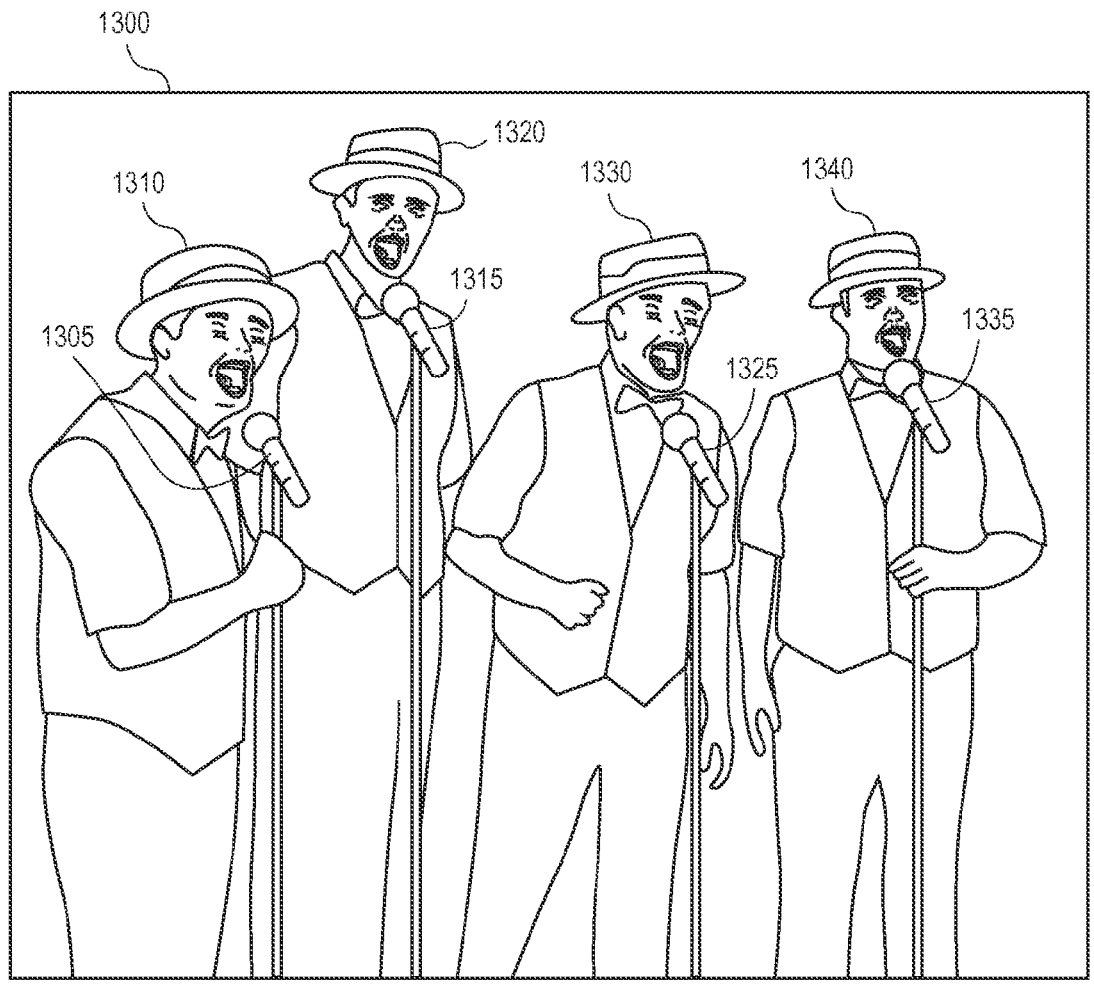
FIG. 13 is a diagram illustrating the presentation of audio from a selected singer in accordance with an embodiment.

Referring next to FIG. 13, a diagram illustrating the presentation of audio from a selected singer is shown. Image 1300 includes singers 1310, 1320, 1330, and 1340. The singers perform their work in front of microphones 1305, 1315, 1325, and 1335, respectively. In the prior art, outputs from the microphones commonly go directly into a mixer, and the individual, unmixed microphone data lost. In the exemplary embodiment, individual audio from each microphone is stored as additional non-video data. When playing a video of the singers, a user can select one singer 1310, by clicking a mouse over, touching a touchpad at, or otherwise selecting the two-dimensional shape of the singer. Selecting the singer causes non-video content associated with the singer to be accessed, including a stored track from the singer's associated microphone, microphone 1305. Audio data recorded from microphone 1305 is played louder than or otherwise overlaid over the mixed soundtrack of the four performers to the user. The user can thus hear singer 1310 better and distinguish his voice and lyrics from the other three performers.

Although professional studios record individual tracks of audio for playback, this is usually in conjunction with later mixing for the final presentation. Sound chambers are often employed to better isolate the different microphones from one another so that mixing is more refined. Left, right, and other tracks are used to manipulate the mixed sound so that it can achieve the desired cinematic and dramatic effect on a viewer. However, much of the raw audio data is held back from public dissemination. Raw content that is included on some DVDs is usually played from a 'bonus menu,' separate from playback of the full-length feature. Further incorporation into the movie can be unwieldy.

Associating audio with a subportion of an image of a movie, allowing a user to select the subportion of the image to select sounds associated with the subportion, and playing the audio louder than or otherwise overlaying the sound over a mixed performance is a novel use of such data. Raw audio or other non-video data that would otherwise be discarded, archived, or withheld from the public can be readily disseminated.

Figure 14:
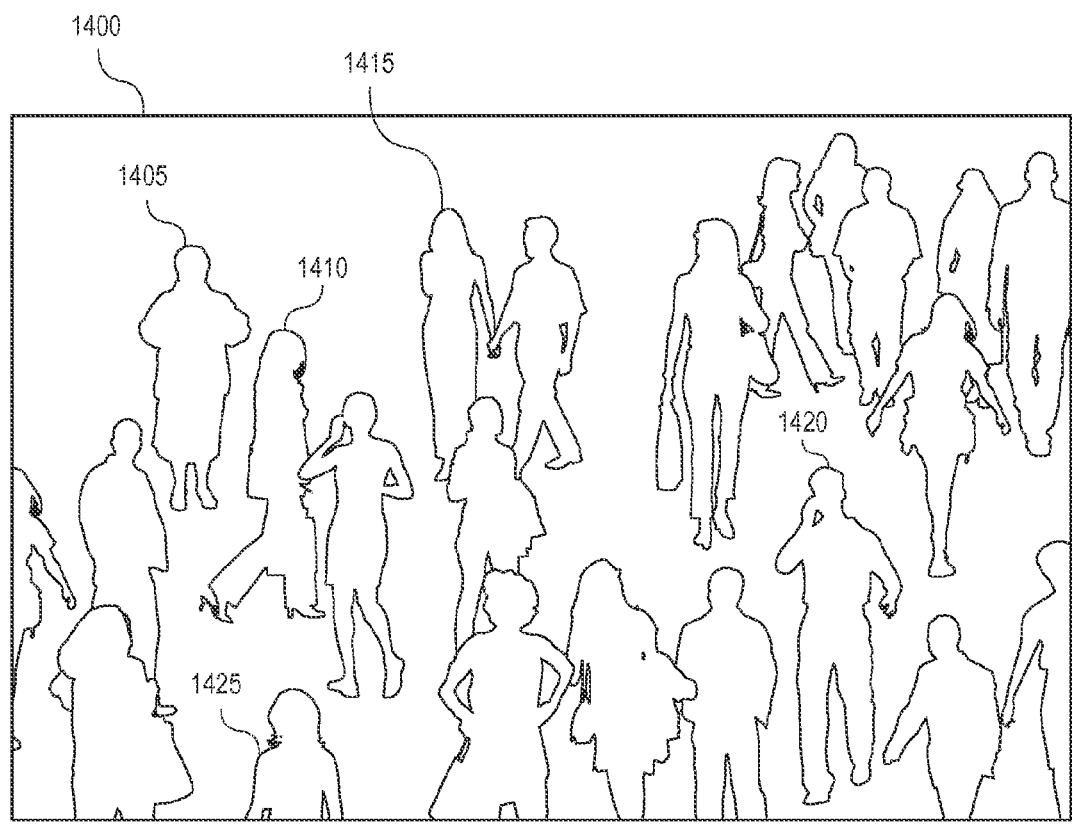
FIG. 14 is a diagram illustrating the presentation of non-video content from selected actors in a crowd scene in accordance with an embodiment.

Referring next to FIG. 14, a diagram illustrating the presentation of non-video content from selected actors in a crowd scene is shown. Image 1400 includes actors 1405, 1410, 1415, 1420, and 1425. The crowd of people is bustling and loud, and a viewer might have trouble understanding different background conversations and plots that are progressing along in parallel with a main story. A viewer can select actor 1405 in order to hear better what a lapel microphone, boom microphone, or other audio pickup device is recording from actor 1405's position. Similarly, actors 1410 and/or 1415 can be selected for access to the raw audio from their respective lapel microphones. Actor 1420 can be selected in order to smell what that actor is experiencing at that location. For example, the wafting of distinct perfume from woman 1425 may be presented to the viewer upon selection of actor 1420. In this respect, a mystery, love story, or other genre of stories can be enhanced.

Figure 15:
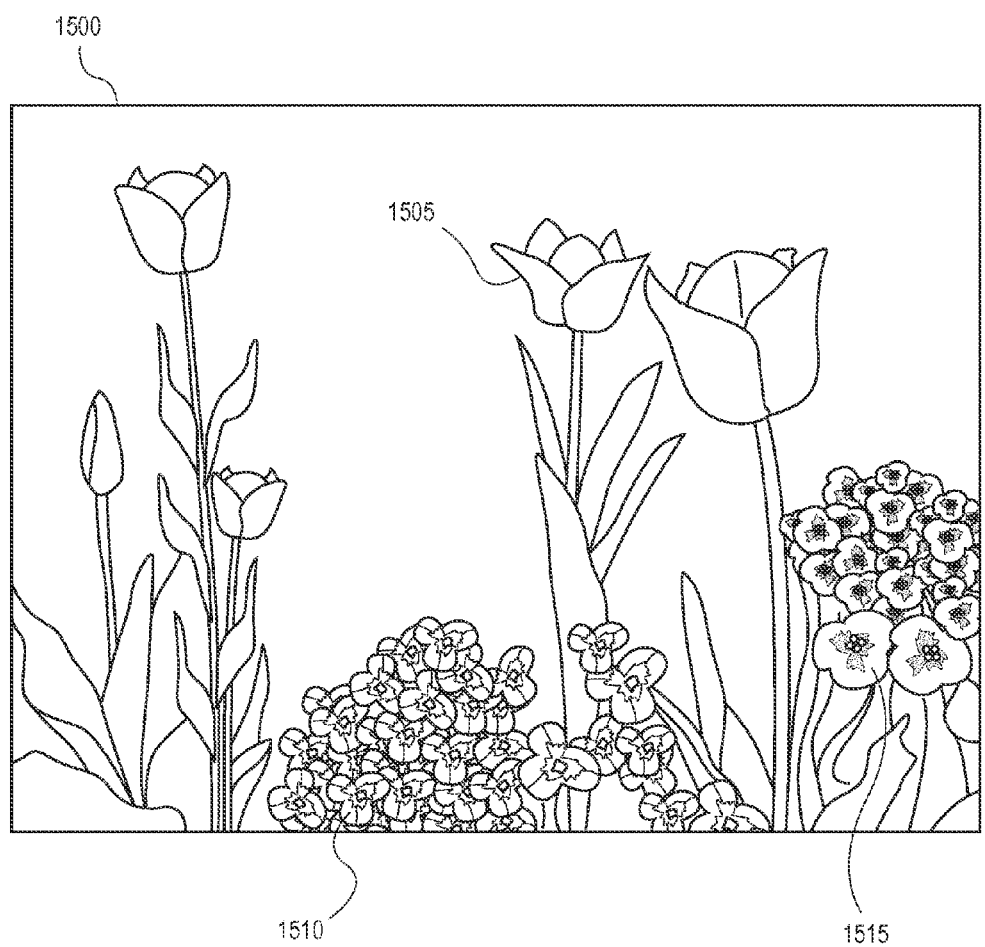
FIG. 15 is a diagram illustrating the presentation of non-video content of flowers in a garden in accordance with an embodiment.

Referring next to FIG. 15, a diagram illustrating the presentation of non-video content from flowers in a garden is shown. Image 1500 includes flowers 1505, 1510, and 1515. Selecting flower 1505 results in an essential oil fragrance of tulips being emitted toward the user. The fragrance can be directed to the selectee user so as to not disturb other watchers of the video. Similarly, selecting flowers 1510 or 1515 results in the flowers' essences being presented to the user. In some embodiments, syntheses of chemicals can be mixed together so that the resulting mixture evokes the scent of the object in the scene. For example, a documentary about a polluted site can have sulfuric, burnt-rubber smells associated with otherwise green farmland to indicate the noxious contamination of the underlying soil.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for augmenting a video, the system comprising:
   a video source configured to provide video content to a video display; and
   a mobile device with a video camera and display, the mobile device configured to:
   capture video data including the video content from the video display using the video camera, the video content from the video display having at least one marker, the at least one marker including at least one time code which identifies a temporal position corresponding to at least a portion of time in the video content;
track the video content in the captured video data;
receive a user selection of a subportion of an image in the captured video data;
access non-video content associated with the subportion of the image and synchronized with the temporal position of the video content using the at least one time code; and
present the accessed non-video content associated with the subportion of the image to a user at substantially the same time as the video content is captured using the video camera.

2. The system of claim 1, wherein the at least one marker comprises encoded audio.

3. The system of claim 1, wherein the at least one marker comprises an anchored pattern.

4. The system of claim 1, wherein the mobile device is further configured to identify a size of the video content.

5. The system of claim 1, wherein the mobile device is further configured to identify an orientation of the video content.

6. The system of claim 1, wherein a type of the non-video content comprises content specified by a user.

7. The system of claim 1, wherein the at least one marker includes one or more markers each having a different value.

8. The system of claim 1, wherein the non-video content is pre-loaded onto the mobile device.

9. The system of claim 1, wherein the non-video content comprises views or angles based on an angle of the mobile device.

10. The system of claim 1, wherein the at least one marker comprises a digital watermark.

11. A computer-implemented method for augmenting video, the method comprising:
capturing video data including video content from a video display, the video data captured with a video camera operatively coupled to a mobile device, the video content from the video display having at least one marker identifying a temporal position within the video content, the at least one marker including at least one time code which identifies a temporal position corresponding to at least a portion of time in the video content;
tracking the video content in the captured video data;
receiving a user selection of a subportion of an image in the captured video data;
accessing non-video content associated with the subportion of the image and synchronized with the temporal position of the video content using the at least one time code; and
presenting the accessed non-video content associated with the subportion of the image to a user at substantially the same time as the video content is captured using the video camera.

12. The computer-implemented method of claim 11, wherein the at least one marker comprises encoded audio.

13. The computer-implemented method of claim 11, wherein the at least one marker comprises an anchored encoded image.

14. The computer-implemented method of claim 11, wherein the mobile device is further configured to identify a size of the video content.

15. The computer-implemented method of claim 11, wherein the mobile device is further configured to identify an orientation of the video content.

16. The computer-implemented method of claim 11, wherein a type of the non-video content comprises content specified by a user.

17. The computer-implemented method of claim 11, wherein the at least one marker includes one or more markers each having a different value.

18. The computer-implemented method of claim 11, wherein the non-video content is pre-loaded onto the mobile device.

19. The computer-implemented method of claim 11, wherein the non-video content comprises views or angles based on an angle of the mobile device.

20. The computer-implemented method of claim 11, wherein the non-video content includes at least one of text, animations, graphic enhancements, advertisements, and hyperlinks.

* * * * *